United States Patent
Shi

(10) Patent No.: US 11,172,264 B2
(45) Date of Patent: Nov. 9, 2021

(54) METHOD AND A DEVICE FOR DISPLAYING AN ANCHOR COMPETITION PROCESS

(71) Applicant: SHANGHAI ZHANGMEN SCIENCE AND TECHNOLOGY CO., LTD., Shanghai (CN)

(72) Inventor: Tiyuan Shi, Shanghai (CN)

(73) Assignee: SHANGHAI ZHANGMEN SCIENCE AND TECHNOLOGY CO., LTD., Shanghai (CN)

(*) Notice: Subject to any disclaimer, the term of this patent is extended or adjusted under 35 U.S.C. 154(b) by 0 days.

(21) Appl. No.: 16/833,701

(22) Filed: Mar. 30, 2020

(65) Prior Publication Data

US 2020/0228877 A1 Jul. 16, 2020

Related U.S. Application Data

(63) Continuation of application No. PCT/CN2018/102182, filed on Aug. 24, 2018.

(30) Foreign Application Priority Data

Sep. 30, 2017 (CN) .......................... 201710923153.7

(51) Int. Cl.
*H04N 21/475* (2011.01)
*H04N 21/2187* (2011.01)
*H04N 21/431* (2011.01)

(52) U.S. Cl.
CPC ..... *H04N 21/4758* (2013.01); *H04N 21/2187* (2013.01); *H04N 21/4312* (2013.01); *H04N 21/4756* (2013.01)

(58) Field of Classification Search
CPC ........... H04N 21/4758; H04N 21/2187; H04N 21/4312; H04N 21/4756; H04N 21/2343; H04N 21/233; H04N 5/45; G07F 17/327
See application file for complete search history.

(56) References Cited

U.S. PATENT DOCUMENTS 9,069,434 B1 * 6/2015 Kuscher ................ G06F 3/0486
9,467,408 B1 * 10/2016 Sherman-Presser .........................
H04N 21/654

(Continued)

FOREIGN PATENT DOCUMENTS

CN 105245546 A 1/2016
CN 105959812 A 9/2016

(Continued)

OTHER PUBLICATIONS

English Machine Translation for WO 2017085644A1, (Year: 2017).*

*Primary Examiner* — Fernando Alcon

(74) *Attorney, Agent, or Firm* — Kilpatrick Townsend & Stockton, LLP

(57) ABSTRACT

The present application provides a method and a device for displaying an anchor competition process. A network device obtains information on user support respectively won by at least two anchors during the competition in real time, wherein the at least two anchors participate in the same anchor competition and are displayed in a same live window; adjusts the display of the anchor competition for the at least two anchors in the live window according to the information on user support respectively won by the at least two anchors; sends the adjusted display of the anchor competition to user equipments displaying the competition between the at least two anchors, or presents the adjusted display of the anchor competition to users who are watching the competition between the at least two anchors. The present application facilitates users to obtain competition information intuitively, improve efficiency of users in obtaining information, and enhance user experience.

11 Claims, 10 Drawing Sheets

(56) References Cited

U.S. PATENT DOCUMENTS

| | | | |
|---|---|---|---|
| 10,284,812 B1* | 5/2019 | Van Os | H04N 21/4316 |
| 2008/0055464 A1 | 3/2008 | Shin | |
| 2008/0319833 A1* | 12/2008 | Svendsen | H04L 12/1822 |
| | | | 705/7.29 |
| 2010/0205543 A1* | 8/2010 | Von Werther | H04L 67/306 |
| | | | 715/753 |
| 2011/0122063 A1* | 5/2011 | Perlman | H04N 19/169 |
| | | | 345/161 |
| 2013/0167078 A1* | 6/2013 | Monnig | G06F 3/0484 |
| | | | 715/800 |
| 2013/0324247 A1* | 12/2013 | Esaki | H04N 21/472 |
| | | | 463/31 |
| 2015/0121437 A1* | 4/2015 | Tan | H04N 21/2187 |
| | | | 725/93 |
| 2015/0264301 A1* | 9/2015 | Paragano | H04L 12/1813 |
| | | | 348/14.07 |
| 2017/0064359 A1* | 3/2017 | Houston | H04N 21/23424 |
| 2017/0085854 A1* | 3/2017 | Furesjo | H04N 7/152 |
| 2019/0099653 A1* | 4/2019 | Wanke | H04N 21/4758 |
| 2021/0060404 A1* | 3/2021 | Wanke | H04L 67/38 |

FOREIGN PATENT DOCUMENTS

| | | |
|---|---|---|
| CN | 106534879 A | 3/2017 |
| CN | 106612464 A | 5/2017 |
| CN | 106791894 A | 5/2017 |
| CN | 106803965 A | 6/2017 |
| CN | 107613311 A | 1/2018 |
| WO | WO 2017085644 A1 * | 9/2016 |
| WO | 2016210298 A1 | 12/2016 |

* cited by examiner

User 1: competition between anchor a and anchor b
User 2: competition between anchor a and anchor c
User 3: competition between anchor b and anchor a
User 4: competition between anchor a and anchor f
User 5: competition between anchor b and anchor a
User 6: competition between anchor b and anchor c
User 7: competition between anchor b and anchor f
User 8: competition between anchor a and anchor b

......

User 20: competition between anchor a and anchor b

......

wherein competition between anchor a and anchor b initiated by users is totaled as 606.

FIG. 4

| Anchor No. | Nickname of Anchor | Information on User Support ||||||
|---|---|---|---|---|---|---|---|
| | | Number of viewers (ten thousand) | Number of Likings (ten thousand) | Number of flowers (ten thousand) | Number of red packets (ten thousand) | Luxury Cars (unit) | Yachts (unit) |
| 116 | aa | 3850 | 3612 | 3005 | 2591 | 0 | 0 |
| 117 | ce | 10000 | 9989 | 9775 | 9153 | 5 | 1 |
| 118 | dc | 9572 | 9131 | 8964 | 8005 | 3 | 0 |
| 119 | ee | 5130 | 5001 | 4176 | 3997 | 0 | 0 |
| 120 | ff | 6421 | 5510 | 2901 | 589 | 0 | 0 |

FIG. 13

| No. of Anchors Participating in a Competition | Nicknames of Anchors Participating in a Competition | Information on Support Comparison between Two Anchors |
|---|---|---|
| ... | ... | ... |
| 116、119 | aa、ee | 2:3 |
| 117、118 | ce、dc | 10:9 |
| 119、120 | ee、ff | 7:6 |
| 116、120 | aa、ff | 4:3 |
| 201、300 | bb、dd | 1:1 |
| 120、207 | ff、ll | 8:5 |
| ... | ... | ... |

FIG.14

METHOD AND A DEVICE FOR DISPLAYING AN ANCHOR COMPETITION PROCESS

CROSS REFERENCE TO THE RELATED APPLICATION

This application is the continuation application of International Application No. PCT/CN2018/102182, filed on Aug. 24, 2018, which is based upon and claims priority to Chinese Patent Application No. 201710923153.7, filed on Sep. 30, 2017, the entire contents of which are incorporated herein by reference.

TECHNICAL FIELD

The present application relates to communication, and more particularly relates to a technology for displaying an anchor competition process.

BACKGROUND

With the development of network technology, people increasingly watch live shows, and anchors are also quite popular with the public. Rankings of anchors are generated by carrying on, via a system platform, statistics on support expressed for the anchors by users who are watching. Most of methods of displaying rankings of anchors in the prior art are shown in text lists, which lacks intuitiveness and affects efficiency and experience of users in obtaining information.

SUMMARY

One objective of the present application is to provide a method and a device for displaying an anchor competition process.

According to one aspect of the present application, a method for displaying an anchor competition process is provided. The method comprises: obtaining information on user support respectively won by at least two anchors during the competition in real time, wherein the at least two anchors participate in the same anchor competition and are displayed in a same live window; adjusting the display of the anchor competition for the at least two anchors in the live window according to the information on user support respectively won by the at least two anchors; and sending the adjusted display of the anchor competition to user equipments of users who are watching the competition between the at least two anchors.

According to another aspect of the present application, a device for displaying an anchor competition process is provided. The device comprises: a processor; and a memory configured to store computer executable instructions, wherein the executable instructions, when executed, cause the processor to: obtain information on user support respectively won by at least two anchors during the competition in real time, wherein the at least two anchors participate in the same anchor competition and are displayed in a same live window; adjust the display of the anchor competition for the at least two anchors in the live window according to the information on user support respectively won by the at least two anchors; and send the adjusted display of the anchor competition to user equipments of users who are watching the competition between the at least two anchors.

According to one aspect of the present application, a computer readable medium comprising instructions is provided, wherein the instructions, when executed, cause a system to: obtain information on user support respectively won by at least two anchors during the competition in real time, wherein the at least two anchors participate in the same anchor competition and are displayed in a same live window; adjust the display of the anchor competition for the at least two anchors in the live window according to the information on user support respectively won by the at least two anchors; and send the adjusted display of the anchor competition to user equipments of users who are watching the competition between the at least two anchors.

Compared with the prior art, an aim of the present application is in that: a network device obtains information on users' support for anchors in a competition in real time, adjusts a split-screen-display for the anchors in the live window, and provides it to users who are watching the live competition, so as to facilitate users to obtain competition information intuitively, improve efficiency of users in obtaining information, and enhance using experience of users. Also, the present application may also adjust the display of the anchor competition for anchors participating in a competition in the live window according to information on support comparison between the anchors, such as adjusting a screen-occupied ratio, clarity, volume, or the like, so as to further improve efficiency of users in obtaining information, and enhance using experience of users. In addition, the present application may also determine anchors who participate in a competition in connection with an anchor matching threshold, thereby attracting more users to watch and join anchors' live competitions, facilitating more users to obtain required information, and improving network bandwidth resources utilization.

DESCRIPTIONS OF THE DRAWINGS

Other features, objects, and advantages of the present application will become more apparent by reading the detailed description of non-limiting embodiments with reference to the following drawings:

FIG. 4 shows a schematic diagram of an application scenario according to some embodiments of the present application;

FIGS. 6-14 shows a schematic diagram of an application scenario according to some embodiments of the present application respectively.

The identical or similar reference numerals in the drawings represent the identical or similar components.

DETAILED EMBODIMENTS

Figure 1:
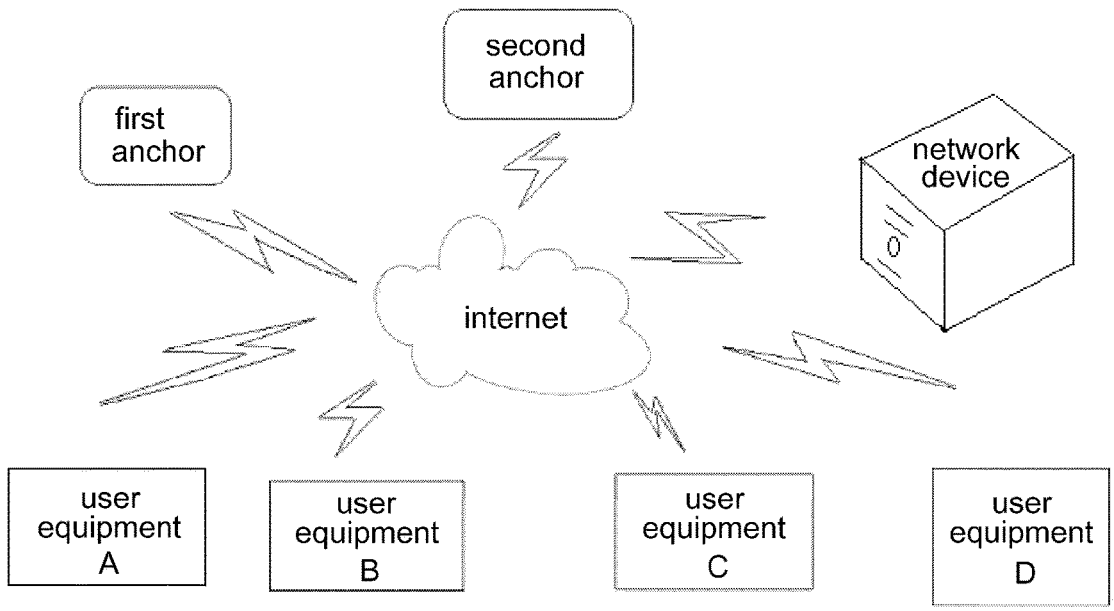
FIG. 1 shows a topology diagram of a system for displaying an anchor competition process according to one embodiment of the present application.

The application is further described in detail below with reference to the accompanying drawings.

In a typical configuration of the present application, a terminal, a device of a service network and a trusted party all include one or more processors (CPUs), an input/output interface, a network interface and a memory.

The memory may include a non-permanent memory, a random access memory (RAM) and/or a non-volatile memory and the like in a computer-readable medium, such as a read-only memory (ROM) or a flash memory (flash RAM)). A memory is an example of a computer-readable medium.

A computer-readable medium comprises permanent and non-permanent, movable and non-movable media and may implement information storage by means of any method or technology. Information may be computer-readable instructions, data structures, program modules or other data. The examples of a computer storage medium include but are not limited to a phase change memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technologies, compact disk read-only memory (CD-ROM), a digital versatile disc (DVD) or other optical storages, a magnetic cassette tape, and magnetic tape and magnetic disk storage or other magnetic storage devices or any other non-transmission media, which can be used to store information that can be accessed by a computing device.

The devices referred to in the present application include, but are not limited to, user equipments, network devices, or devices formed by the integration of user equipments and network devices through a network. User equipments include but are not limited to any type of mobile electronic products capable of human-machine interaction with users (e.g., via touchpads), for example, an intelligent phone, a tablet, etc. The mobile electronic products can run on any operating system, such as android operating system, iOS operating system, etc. Network devices include an electronic device of automatically performing numeral calculations and information processing according to preset or stored instructions. The hardware includes but is not limited to micro-processors, application specific integrated circuits (ASIC), programmable logic device (PLD), field programmable gate array (FPGA), digital signal processors (DSP), embedded devices, etc. Network devices include but are not limited to: computers, mainframes, single network server, a cloud composed of multiple network server sets or multiple servers. Cloud as used herein is formed by a massive amount of computers or network servers based on cloud computing, wherein cloud computing is a type of distributed computing, which is a virtual super computer composed of a group of loosely coupled computer sets. Networks include but are not limited to internet, Wide Area Network (WAN), Metropolitan Area Network (MAN), Local Area Network (LAN), Virtual Private Network (VPN), wireless ad-hoc network, etc. In one embodiment, the device may also be programs running on user equipments, network devices, or user equipments and network devices, network devices, touch terminals, or a device composed by integration of network devices and touch terminals through a network.

Of course, it can be appreciated by those skilled in the art that the above mentioned device is merely an example. Other existing devices or those that may appear in the future fall within the protection scope of the application and are incorporated herein by reference, if applicable to the present application.

In the description of the present application, the term "a plurality of" means two or more, unless it is clearly and specifically defined otherwise.

FIG. 1 shows a typical application scenario of the present application. A network device monitors and obtains information on user support for a first anchor and a second anchor participating in an anchor competition in real time, adjusts and controls the respective displays of the competition for the first and second anchors in the live window, and sends the adjusted display of the anchor competition to user equipments A, B, C, or D and the like displaying the anchor competition. This solution may be performed by a network device, or may also be performed by a user equipment. This solution may be applicable to an anchor competition in which two anchors participate, or may also be applicable to an anchor competition in which three or more anchors participate. Here, for the sake of simplicity, the present application will take a network device and an anchor competition in which two anchors participate as an example to set forth the corresponding embodiments. It can be appreciated by those skilled in the art that these embodiments, except for several embodiments explicitly shown, may also be performed by a user equipment, and may also be applicable to anchor competitions in which three or more anchors participate.

In some embodiments, the method of displaying an anchor competition process comprises: obtaining information on user support respectively won by at least two anchors during the competition in real time, wherein the at least two anchors participate in the same anchor competition and are displayed in a same live window; adjusting the display of the anchor competition for the at least two anchors in the live window according to the information on user support respectively won by the at least two anchors; and sending the adjusted display of the anchor competition to user equipments displaying the competition between the at least two anchors, or presenting the adjusted display of the anchor competition to users who are watching the competition between the at least two anchors.

Figure 2:
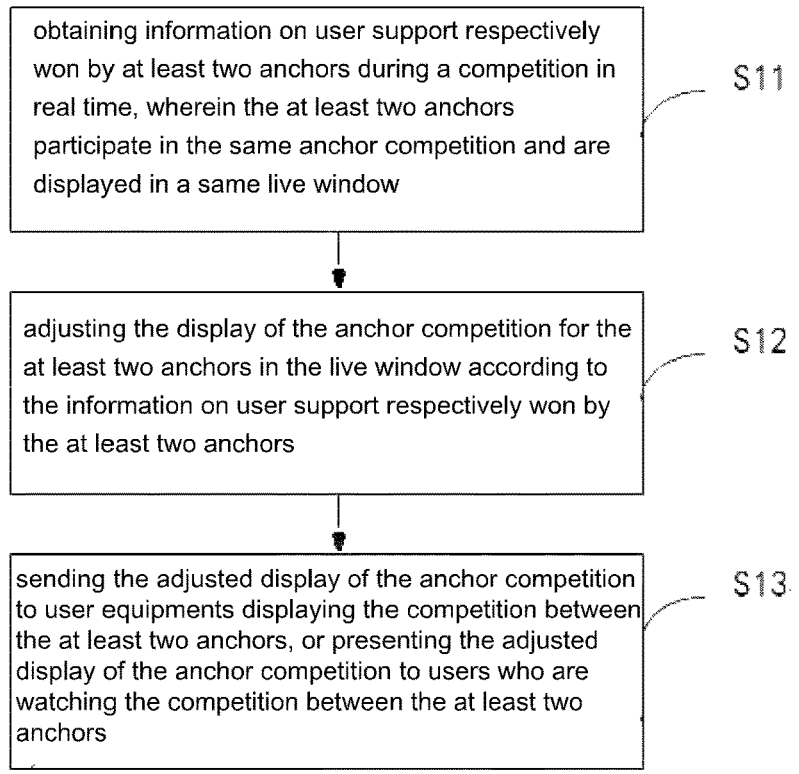
FIG. 2 shows a flowchart of a method for displaying an anchor competition process according to some embodiments of the present application.

For example, FIG. 2 shows a flowchart of a method for displaying an anchor competition process according to some embodiments of the present application. The method comprises steps S11, S12, and S13. In step S11, a network device obtains information on user support respectively won by at least two anchors during the competition in real time, wherein the at least two anchors participate in the same anchor competition and are displayed in a same live window. In step S12, the network device adjusts the display of the anchor competition for the at least two anchors in the live window according to the information on user support respectively won by the at least two anchors. In step S13, the network device sends the adjusted display of the anchor competition to user equipments displaying the competition between the at least two anchors, or presents the adjusted display of the anchor competition to users who are watching the competition between the at least two anchors.

In specific, in step S11, the network device obtains information on user support respectively won by at least two anchors during the competition in real time, wherein the at least two anchors participate in the same anchor competition and are displayed in a same live window. The at least two anchors include, but are not limited to, the first anchor and the second anchor. The information on user support includes, but is not limited to: users watching, liking, sending flowers, giving red packets or gifts such as luxury cars, yachts etc. For example, during the anchor competition, a same anchor competition process in which the first and second anchors participate is displayed in a same live window on a user equipment. User A expresses his/her support for the first anchor that he/she favors by liking, and user B expresses his/her support for the second anchor that he/she favors by sending flowers, giving red packets, or the like. Information on the support for the anchors is uploaded to a live platform in real time, and is read by the network device on the live platform in real time.

In step S12, the network device adjusts the display of the anchor competition for the at least two anchors in the live window according to the information on user support respectively won by the at least two anchors. The at least two anchors include, but are not limited to, the first anchor and the second anchor. The anchor competition is displayed in the same live window, in which the live video streams of the first and second anchors are displayed in split screens. Here, split-screen-displaying includes, but is not limited to, displaying live video of a competition between two anchors in upper and lower screens or in left and right screens of a same window respectively. For example, information on user support for the first anchor and the second anchor that the network device receives in real time is assumed to be 10,000 likings and 5,000 likings respectively. The network device sets a screen proportion occupied by the first anchor in the live window as ⅔, and sets the screen proportion occupied by the second anchor in the live window as ⅓. Then the first anchor and the second anchor are displayed in live in the live window according to this setup.

In step S13, the network device sends the adjusted display of the anchor competition to user equipments of users who are watching the competition between the at least two anchors, for the users to watch the anchor competition. Continued with the above example, the network device sends the adjusted display of the anchor competition to user equipments A, B, C, or D and the like displaying the anchor competition. Accordingly, users who are watching the anchor competition would see the first anchor and the second anchor in the live window at the same time. A ratio of the screen-occupied proportion of the first anchor to that of the second anchor is 2:1, so as to indicate that a user support level won by the first anchor is twice as that won by the second anchor. It can be appreciated by those skilled in the art that, when this solution is performed by a user equipment, in step S13, the user equipment sends the adjusted display of the anchor competition to user equipments displaying the competition between the at least two anchors, or presents the adjusted display of the anchor competition to users who are watching the competition between the at least two anchors. For example, the user equipment displays the adjusted display of the anchor competition on its screen, for users to watch the anchor competition.

Figure 3:
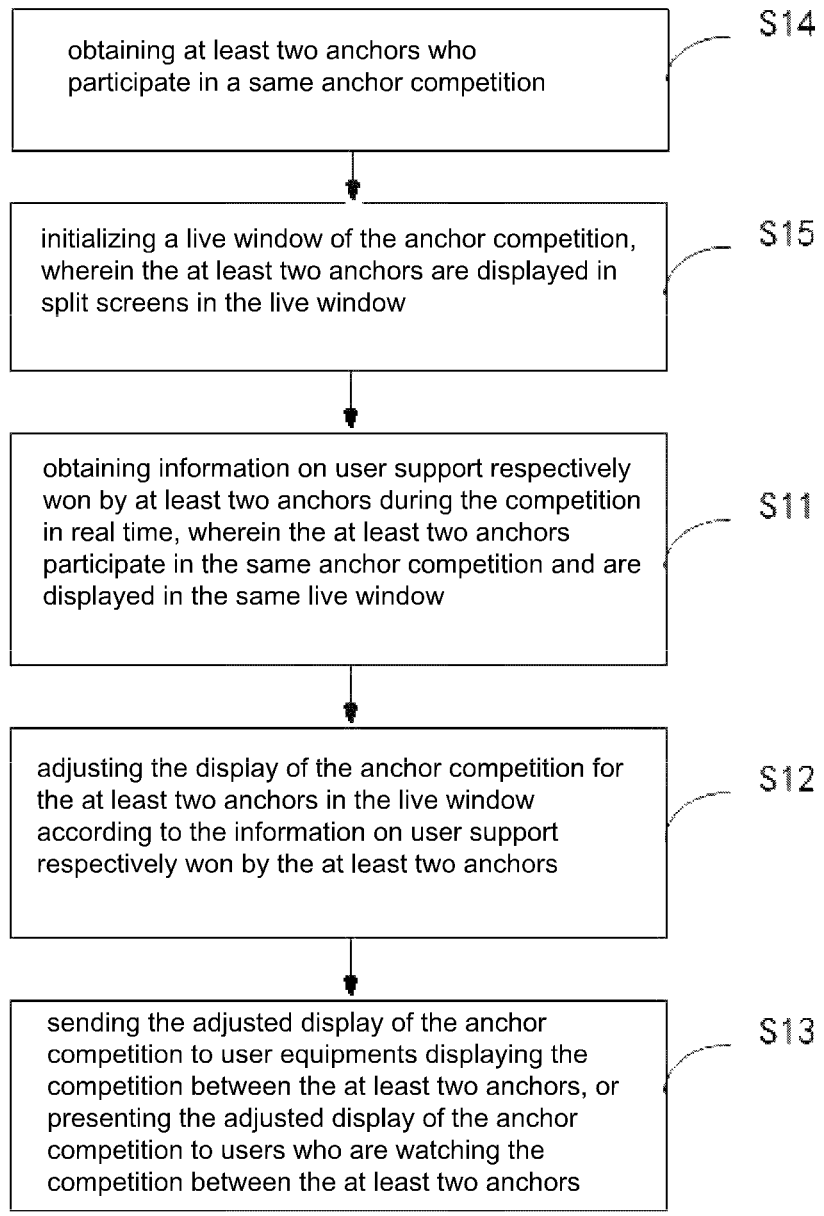
FIG. 3 shows a flowchart of a method for displaying a competition process according to some other embodiments of the present application.

FIG. 3 shows a flowchart of a method for displaying an anchor competition process according to some embodiments of the present application. The method comprises steps S14, S15, S11, S12, and S13. In step S14, the network device obtains at least two anchors who participate in a same anchor competition. In step S15, the network device initializes the live window of the anchor competition, wherein the at least two anchors are displayed in split screens in the live window. In step S11, the network device obtains information on user support respectively won by at least two anchors during the competition in real time, wherein the at least two anchors participate in the same anchor competition and are displayed in the same live window. In step S12, the network device adjusts the display of the anchor competition for the at least two anchors in the live window according to the information on user support for the at least two anchors. In step S13, the network device sends the adjusted display of the anchor competition to user equipments displaying the competition between the at least two anchors, or presents the adjusted display of the anchor competition to users who are watching the competition between the at least two anchors. Here, steps S11, S12, and S13 are same as or substantially same as those in the previous embodiments. Therefore these steps are not repeated, and are merely incorporated herein by reference.

For example, in step S14, the network device reads and obtains at least two anchors who participate in the same anchor competition from an anchor competition calendar; or the network device determines the first anchor and the second anchor who participate in the same anchor competition in real time according to information on rankings of anchors or information on users' votes and recommendations. For example, the network device selects anchors a and b who are ranked close to each other to compete.

In step S15, the network device initializes the live window of the anchor competition, wherein the at least two anchors are displayed in split screens in the live window. For example, the network device obtains the live video streams of the first anchor and the second anchor participating in the competition, and displays the two live video streams in split screens in a same live window according to an initial setup. For example, the initial setup is that each of the two anchors occupies ½ of the live window screen respectively. In some embodiments, the initial setup also comprises volume or clarity settings for each of the live video streams.

In some embodiments, the network device determines at least two anchors who participate in a same anchor competition according to anchor related information. Here, the anchor related information includes, but is not limited to: information on rankings of anchors; information on recommended anchor competitions initiated by users; information on competition invitations initiated between anchors.

For example, the network device monitors and obtains information on user support for anchors in real time, and then carries on statistics on the information to generate rankings, as shown in Table 1 below. The closer two anchors are ranked, the more likely that they participate in a live competition.

TABLE 1

| Anchor No. | Nickname of Anchor | Rankings |
|---|---|---|
| 601 | BB | 11 |
| 101 | AA | 12 |
| 305 | CC | 14 |
| ... | ... | ... |
| 403 | AB | 113 |
| 505 | CD | 114 |
| ... | ... | ... |

According to the information on rankings in Table 1, the network device determines that anchor BB with No. 601, anchor AA with No. 101, or anchor CC with No. 305 would have live competitions with each other at different times; and anchor AB with No. 403 and anchor CD with No. 505 would have a live competition.

In some embodiments, the network device receives information on recommended anchor competitions initiated by users. As in the application scenario shown in FIG. 4, the more information on the recommended competition between two anchors initiated by users is obtained in statistics, the more likely the two anchors participate in the live competition. All of User 1, user 8 and user 20 support their favorite anchor a to compete with anchor b, while both user 3 and user 5 support their favorite anchor b to compete with anchor a, or the like. Finally, it is determined that the anchors a and b are going to compete.

In some other embodiments, the network device has received information for multiple times that anchor a invited anchor b to compete; or the network device has received information for multiple times that anchor a invited anchor b to compete, and meanwhile has also received information that anchor b invited anchor a to compete; or the network device has received information for multiple times that anchor a invited anchor b to compete, and meanwhile anchor b agreed to compete with anchor a. Finally, it is determined that the anchors a and b are going to compete.

It can be appreciated by those skilled in the art that the above mentioned anchor related information is merely an example. Other existing anchor related information or those that may appear in the future all fall within the protection scope of the present application and are incorporated herein by reference, if applicable to the present application.

In some embodiments, the network device determines at least two anchors who participate in a same anchor competition according to the anchor related information and information on an anchor matching threshold, wherein a matching degree between the at least two anchors is greater than or equals to the anchor matching threshold. Here, the matching degree between the at least two anchors being greater than or equaling to the anchor matching threshold includes, but is not limited to: a matching degree between any two anchors is greater than or equals to the anchor matching threshold; wherein there is at least one anchor b for each anchor a, such that a matching degree between anchor a and anchor b is greater than or equals to the anchor matching threshold; and there are anchors c and d out of at least two anchors, such that a matching degree between anchor c and anchor d is greater than or equals to the anchor matching threshold.

For example, the network device determines a first anchor and a second anchor who participate in a same anchor competition according to the anchor related information and information on an anchor matching threshold, wherein a matching degree between the first anchor and the second anchor is greater than or equals to the anchor matching threshold. For example, the network device first determines the first anchor and the second anchor that are going to participate in a same anchor competition according to the anchor related information and then detects whether a matching degree between the first anchor and the second anchor is greater than or equals to the anchor matching threshold. If so, it is determined that the first anchor and the second anchor are going to participate in the same anchor competition; otherwise, two anchors who participate in the same anchor competition are reselected. For example, it is assumed that the anchor matching threshold is 90%. The network device has determined anchors a and b who are going to participate in a same anchor competition according to the anchor related information. If a matching degree between anchor a and anchor b is 80%, anchors a and b cannot participate in the same anchor competition because the matching degree of 80% is less than the anchor matching threshold of 90%. If the matching degree between anchor a and anchor b is 95%, anchors a and b are going to participate in the same anchor competition because the matching degree of 95% is greater than the anchor matching threshold of 90%.

Here, the method of determining a matching degree between the first anchor and the second anchor includes, but is not limited to:

1) determining the matching degree between the first anchor and the second anchor according to a ranking interval between the two anchors. For example, different matching degrees are obtained if the ranking interval falls in different ranges. For example, assuming that the rankings of anchors a and b are Ra and Rb respectively, then the difference between Ra and Rb is the ranking interval between the two anchors. The matching degree is 100% if the ranking interval is less than 10; the matching degree is 90% if the ranking interval is greater than 10 and less than 50; the matching degree is 80% if the ranking interval is greater than 50 and less than 100; and so on.

2) determining the matching degree between the first anchor and the second anchor according to user support levels for the two anchors. For example, a ratio of the lower one to the higher one of the user support levels for the two anchors is used as the matching degree between the two anchors. For example, assuming that the user support levels for anchor a and anchor b are 1,000,000 and 2,000,000 respectively, then a ratio of 1,000,000 to 2,000,000, i.e., 50% is the matching degree between the two anchors.

It can be appreciated by those skilled in the art that the above mentioned method of determining a matching degree between the anchors is merely an example. Existing methods of determining the matching degree between the anchors or those that may appear in the future all fall within the protection scope of the present application and are incorporated herein by reference, if applicable to the present application.

Figure 5:
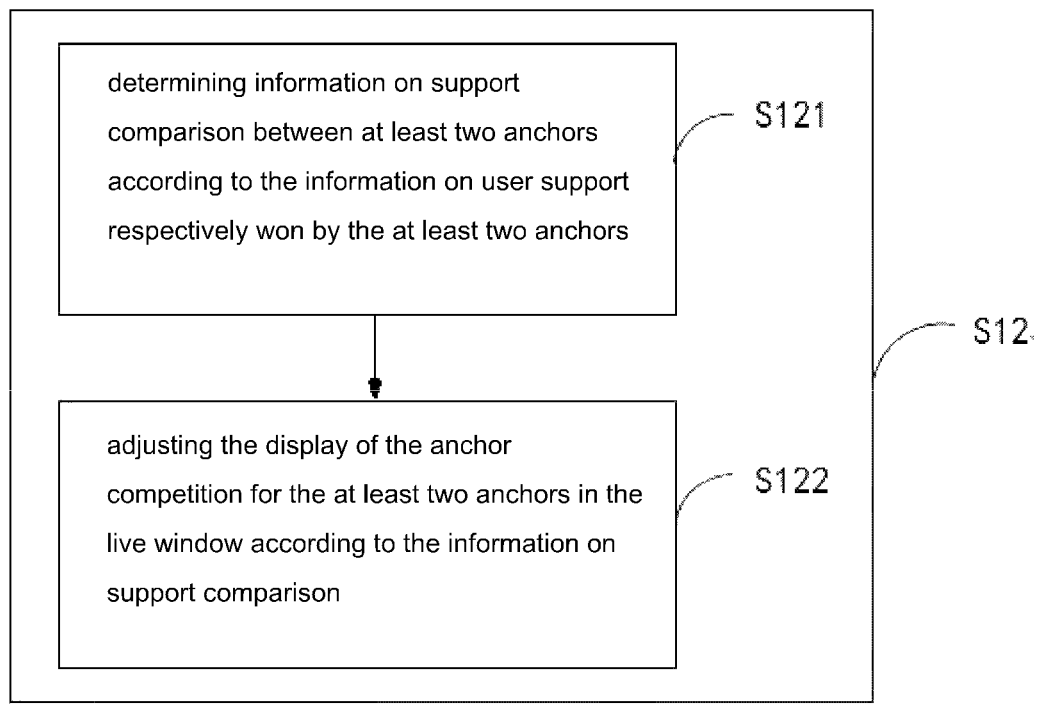
FIG. 5 shows a flowchart of a method for displaying parts of a competition process according to some embodiments of the present application.

In some embodiments, step S12 in this solution comprises steps S121 and S122. In step S121, the network device determines information on support comparison between the at least two anchors according to the information on user support respectively won by the at least two anchors. In step S122, the display of the anchor competition for the at least two anchors in the live window is adjusted according to the information on support comparison. More details are shown in FIG. 5.

For example, in some embodiments, the network device obtains information on user support for anchors in real time, as shown in Table 2 below.

TABLE 2

| Anchor No. | Nickname of Anchor | Information on User Support | | | | | |
|---|---|---|---|---|---|---|---|
| | | Number of viewers (ten thousand) | Number of Likings (ten thousand) | Number of flowers (ten thousand) | Number of red packets (ten thousand) | Luxury Cars (unit) | Yachts (unit) |
| 116 | aa | 3850 | 3612 | 3005 | 2591 | 0 | 0 |
| 117 | ce | 10000 | 9989 | 9775 | 9153 | 5 | 1 |
| 118 | dc | 9572 | 9131 | 8964 | 8005 | 3 | 0 |
| 119 | ee | 5130 | 5001 | 4176 | 3997 | 0 | 0 |
| 120 | ff | 6421 | 5510 | 2901 | 589 | 0 | 0 |

With reference to information on user support for the anchors in Table 2, information on support comparison between the anchors is determined, and the display of the competition for anchors participating in the competition in the live window is adjusted accordingly. The method of determining information on support comparison between the anchors participating in the competition includes, but is not limited to: determining the information on support comparison between the anchors according to any dimension of information on user support, or determining the information on support comparison between the anchors according to the most weighted dimension of the information on user support, or determining the information on support comparison between the anchors by weighting the dimensions of the information on user support according to the dimensions' weight. For example, information on support comparison between anchor aa with No. 116 and anchor ee with No. 119 is determined as 3:4 based on the fact that the information on user support in terms of number of flowers for the two anchors are 3005 and 4176 respectively. The display of the anchor competition for the two anchors in the live window is adjusted accordingly. Information on support comparison between the two anchors is determined as 2:3 based on the fact that the information on user support in terms of number of red packets for the two anchors are 2591 and 3997 respectively. The display of the anchor competition for the two anchors in the live window is adjusted accordingly. Information on support comparison between the two anchors is determined as 1:1 based on the fact that information on user support in terms of luxury cars or yachts for the two anchors are 0 and 0 respectively. The display of the anchor competition for the two anchors in the live window is adjusted accordingly.

For example, it is assumed that the weight of luxury cars is the highest among the weights of information on user support won by anchor ce with No. 117 and anchor dc with No. 118. Information on support comparison between the two anchors is determined as 5:3 based on the information on user support in terms of luxury cars. The display of the anchor competition for the two anchors in the live window is adjusted accordingly.

As another example, assuming that the weights of dimensions such as number of viewers, number of likings, number of flowers and number of red packets, or the like, among the weights of information on user support won by anchor ee with No. 119 and anchor ff with No. 120, are 0.1, 0.2, 0.3, and 0.4 respectively, the information on user support for the two anchors are 4363 and 2849 respectively. The information on support comparison between the two anchors is determined as 2:1. The display of the anchor competition for the two anchors in the live window is adjusted accordingly.

It can be appreciated by those skilled in the art that the above mentioned method of determining information on support comparison is merely an example. Other existing methods of determining the information on support comparison or those that may appear in the future all fall within the protection scope of the present application and are incorporated herein by reference, if applicable to the present application.

In some embodiments, adjusting the display of the anchor competition includes, but is not limited to:
adjusting a ratio of screen-occupied proportions of the at least two anchors in the live window such that the ratio of screen-occupied proportions is adaptive with the support comparison;

adjusting a clarity comparison between the at least two anchors in the live window such that the clarity comparison is adaptive with the support comparison;

adjusting a volume comparison between the at least two anchors in the live window such that the volume comparison is adaptive with the support comparison.

Adjusting the ratio of screen-occupied proportions of the at least two anchors in the live window further comprises:
in the process of adjusting the ratio of screen-occupied proportions, if a screen usage proportion of one of the at least two anchors in the live window is less than or equals to a screen proportion threshold, reducing clarity or volume of the anchor in the live window such that the clarity comparison or the volume comparison between the at least two anchors is adaptive with the support comparison.

Here, the magnitude adjusted with regard to the ratio of screen-occupied proportions, the clarity comparison, or the volume comparison may be a set magnitude value or magnitude proportion, or may be determined by querying a predetermined magnitude mapping table according to the support comparison, or may be randomly generated within an applicable magnitude range.

Here, the ratio of screen-occupied proportions refers to the ratio of the screen sizes used by two anchors participating in the competition when the anchors are displayed in split screens in the live window. For example, the ratio of screen-occupied proportions of the two anchors is 1:1 when the anchors use the live window equally; or the ratio of screen-occupied proportions of the two anchors is 2:1 when one of the anchors uses ⅔ of the live window and the other uses ⅓ of the live window. Here, split-screen-displaying includes, but is not limited to, displaying live videos of a competition between two anchors in upper and lower screens or in left and right screens of a same window respectively.

In some embodiments, information on support comparison between the anchors is determined according to information on user support for the anchors, as shown in Table 3 below. The display of the anchor competition in the live window is adjusted accordingly.

TABLE 3

| No. of Anchors Participating in the Competition | Nicknames of Anchors Participating in the Competition | Information on Support Comparison between Two Anchors |
| --- | --- | --- |
| . . . | . . . | . . . |
| 116, 119 | aa, ee | 2:3 |
| 117, 118 | ce, de | 10:9 |
| 119, 120 | ee, ff | 7:6 |
| 116, 120 | aa, ff | 4:3 |
| 201, 300 | bb, dd | 1:1 |
| 120, 207 | ff, ll | 8:5 |
| . . . | . . . | . . . |

Referring to Table 3, information on a ratio of screen-occupied proportions of two anchors participating in the competition in the live window is obtained according to the information on support comparison between the anchors, which indicates that one of the anchors is at an advantage in the competition. Further, the screen-occupied proportion of the anchor in the live competition window is increased. Support comparison between anchor aa with No. 116 and anchor ee with No. 119 is determined as 2:3. Thus a ratio of screen-occupied proportions of the two anchors in live window is obtained as 2:3, which indicates that anchor ee with No. 119 is at an advantage in the competition. Further, the screen-occupied proportion of anchor ee with No. 119 in the live competition window is increased. Support comparison between anchor bb with No. 201 and anchor dd with No. 300 is determined as 1:1. Thus a ratio of screen-occupied proportions of the two anchors in live window is obtained as 1:1, which indicates that two anchors are neck and neck in the competition.

Figure 6:
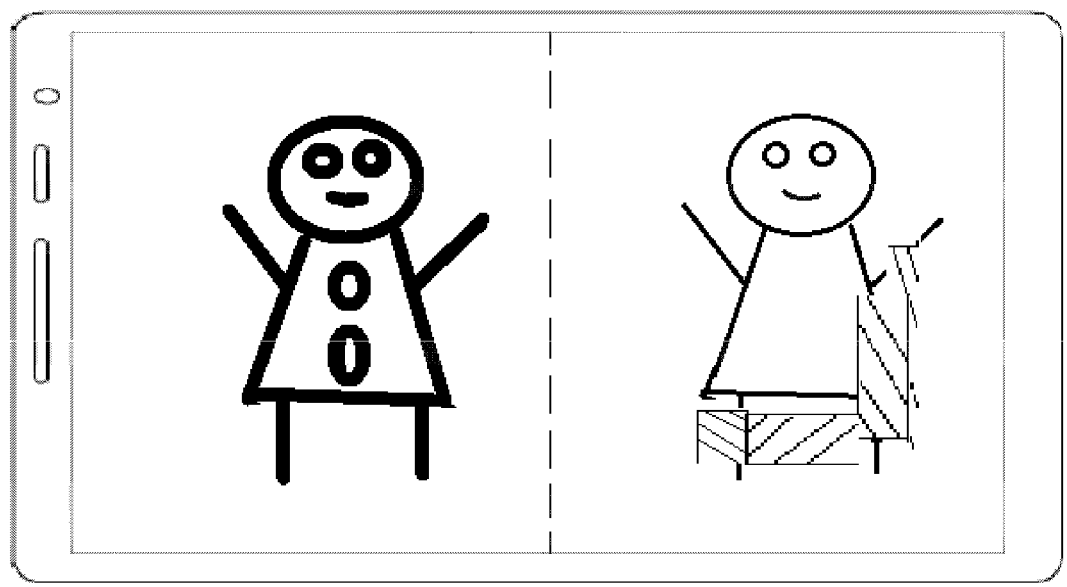

In some embodiments, information on clarity comparison between two anchors participating in the competition in the live window is obtained according to the information on support comparison between the anchors. Thus the anchor not at an advantage in the competition is determined, and the clarity of the anchor in the live competition is reduced so as to indicate that the anchor is at a disadvantage in the competition. For example, FIG. 6 shows an application scenario in some embodiments. The method of reducing the clarity of the anchor in the live competition includes, but is not limited to: blurring whole or part of the body of the anchor, mosaicing the body or the partial body of the anchor, blurring the partial or whole background of the scenario where the anchor is located. It can be appreciated by those skilled in the art that the above mentioned method of reducing the clarity of the anchor in the live competition is merely an example. Other existing methods of reducing the clarity of the anchor in the live competition or those that may appear in the future fall within the protection scope of the present application and are incorporated herein by reference, if applicable to the present application, for example, blurring the entire image of a corresponding anchor.

Referring to Table 3, support comparison between anchor aa with No. 116 and anchor ee with No. 119 is 2:3. It is determined that anchor aa with No. 116 is not at an advantage in the competition. Thus whole or part of the body of the anchor is blurred so as to indicate that the anchor is at a disadvantage in the competition. Support comparison between anchor ce with No. 117 and anchor dc with No. 118 is 10:9. It is determined that anchor dc with No. 118 is not at an advantage in the competition. Thus the body or the partial body of the anchor is mosaiced so as to indicate that the anchor is at a disadvantage in the competition. Support comparison between anchor ee with No. 119 and anchor ff with No. 120 is 7:6. It is determined that anchor ff with No. 120 is not at an advantage in the competition. Thus the partial or whole background of the scenario where the anchor is located is blurred so as to indicate that the anchor is at a disadvantage in the competition.

Figure 7:
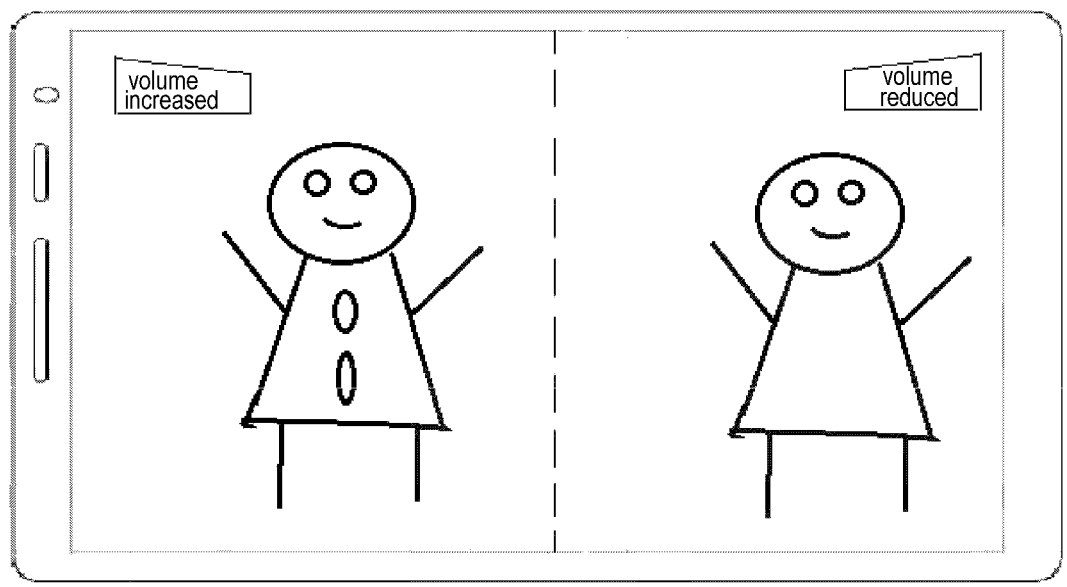

In some embodiments, information on volume comparison between two anchors participating in the competition in the live window is obtained according to the information on support comparison between the anchors. Thus the anchor at an advantage in the competition is determined, and the volume of the anchor in the live competition is increased so as to indicate that the anchor is at an advantage in the competition. The anchor not at an advantage in the competition is determined, and the volume of the anchor in the live competition is reduced so as to indicate that the anchor is at a disadvantage in the competition. For example, FIG. 7 shows an application scenario in some embodiments. Referring to Table 3, support comparison between anchor aa with No. 116 and anchor ee with No. 119 is 2:3. It is determined that anchor aa with No. 116 is not at an advantage in the competition. Thus the volume of the anchor in the live competition is reduced so as to indicate that the anchor is at a disadvantage in the competition. Support comparison between anchor ce with No. 117 and anchor dc with No. 118 is 10:9. It is determined that anchor ce with No. 117 is at an advantage in the competition. Thus the volume of the anchor in the live competition is increased so as to indicate that the anchor is at an advantage in the competition. Support comparison between anchor ee with No. 119 and anchor ff with No. 120 is 7:6. It is determined that anchor ee with No. 119 is at an advantage in the competition, and thus the volume of the anchor in the live competition is increased so as to indicate that the anchor is at an advantage in the competition. It is determined that anchor ff with No. 120 is not at an advantage in the competition, and thus the volume of the anchor in the live competition is reduced so as to indicate that the anchor is at a disadvantage in the competition.

Figure 8:
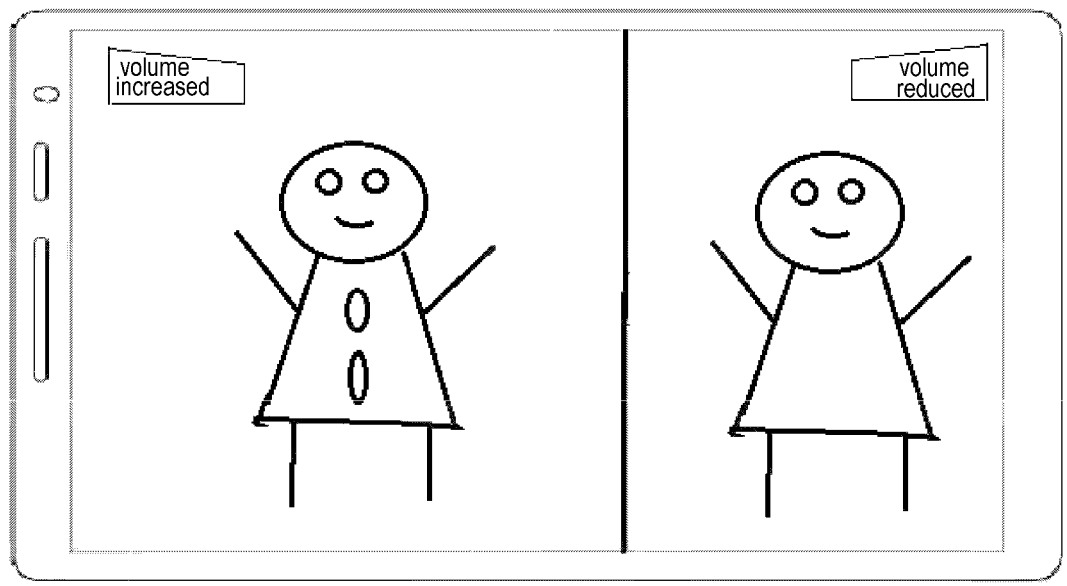

In some embodiments, information on a ratio of screen-occupied proportions, and information on volume comparison between two anchors participating in the competition in the live window are obtained according to information on support comparison between the anchors, which indicates that one of the anchors is at an advantage in the competition and the other is at a disadvantage in the competition. For example, FIG. 8 shows an application scenario in some embodiments. Referring to Table 3, support comparison between anchor aa with No. 116 and anchor ee with No. 119 is determined as 2:3, and thus a ratio of screen-occupied proportions (information on screen-occupied proportion) between the two anchors in the live window is obtained as 2:3. It indicates that anchor ee with No. 119 is at an advantage in the competition, and thus the screen-occupied proportion of the anchor in the live competition is increased. It is determined that anchor aa with No. 116 is not at an advantage in the competition, and thus the volume of the anchor in the live competition is reduced so as to indicate that the anchor is at a disadvantage in the competition. Support comparison between anchor ce with No. 117 and anchor dc with No. 118 is determined as 10:9, and thus a ratio of screen-occupied proportions of the two anchors in the live window is obtained as 10:9. It indicates that anchor ce with No. 117 is at an advantage in the competition, and thus the volume of the anchor in the live competition is increased. It is determined that anchor dc with No. 118 is not at an advantage in the competition, and thus the screen-occupied proportion and volume of the anchor in the live competition are reduced so as to indicate that the anchor is at a disadvantage in the competition. Support comparison between anchor ee with No. 119 and anchor ff with No. 120 is determined as 7:6, and thus a ratio of screen-occupied proportions of the two anchors in the live window is obtained as 7:6. It indicates that anchor ee with No. 119 is at an advantage in the competition, and thus the volume of the anchor in the live competition is increased. It is determined that anchor ff with No. 120 is not at an advantage in the competition, and thus the screen-occupied proportion of the anchor in the live competition is reduced so as to indicate that the anchor is at a disadvantage in the competition.

Figure 9:
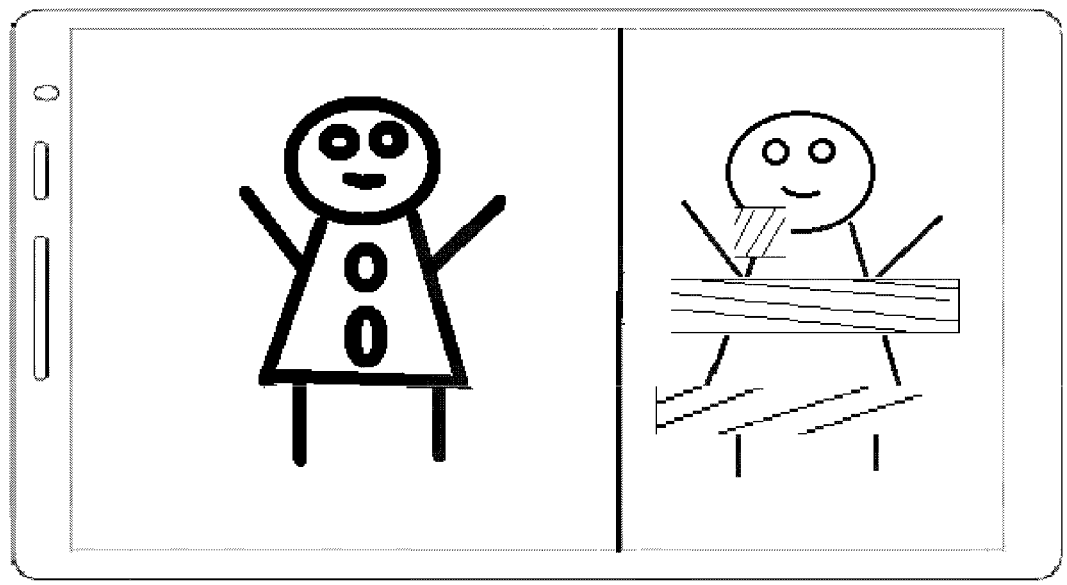

In some embodiments, information on the ratio of screen-occupied proportions, and information on clarity comparison between two anchors participating in the competition in the live window are obtained according to information on support comparison between the anchors, which indicates that one of the anchors is at an advantage in the competition and the other is at a disadvantage in the competition. For example, FIG. 9 shows an application scenario in some embodiments. A screen proportion threshold is the minimum screen usage proportion of the first anchor or the second anchor in the live window, for example, 10%. That is, the screen proportion that the anchor at a disadvantage uses in the live window cannot be less than 10%.

For example, support comparison between anchor le with No. 303 and anchor dl with No. 218 is determined as 1:19.

Thus a ratio of screen-occupied proportions of the two anchors in the live window is determined as 1:19, that is, the screen proportion that anchor le with No. 303 occupies in the live window would be 5%, which is less than the screen proportion threshold of 10%. The network device would reduce the clarity of the anchor in the live competition so as to indicate that the anchor is at a disadvantage in the competition, thereby preventing the anchor competition from being confused as a live show of a single anchor, and thus improving experience of users watching live shows. The method of reducing the clarity of the anchor in the live competition includes, but is not limited to: blurring whole or part of the body of the anchor, mosaicing the body or the partial body of the anchor, blurring the partial or whole background of the scenario where the anchor is located. It can be appreciated by those skilled in the art that the above mentioned method of reducing the clarity of the anchor in the live competition is merely an example. Other existing methods of reducing the clarity of the anchor in the live competition or those that may appear in the future fall within the protection scope of the present application and are incorporated herein by reference, if applicable to the present application, for example, blurring the entire image of a corresponding anchor.

Figure 10:
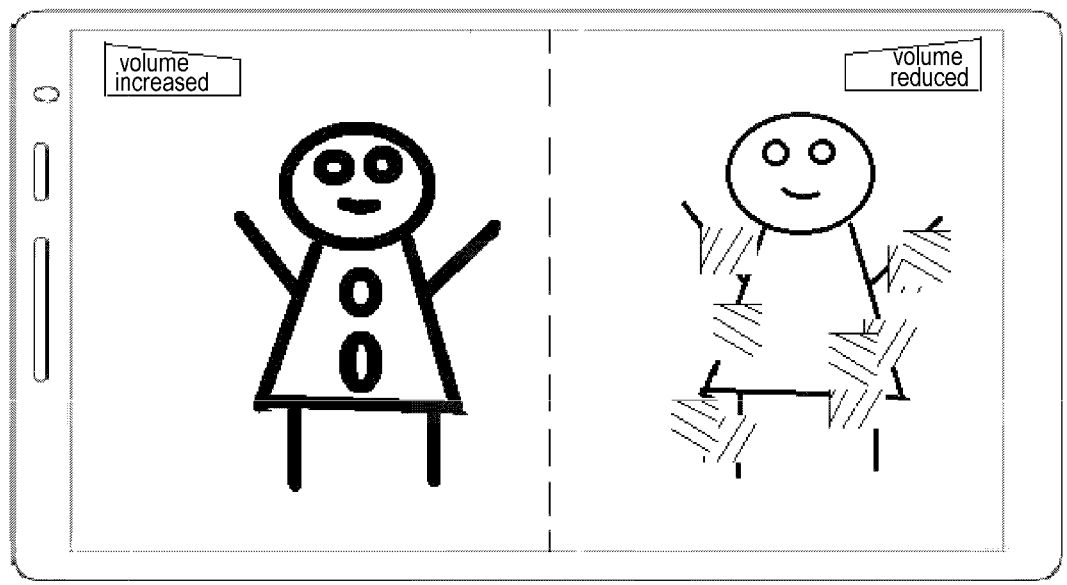

In some embodiments, information on clarity comparison and information on volume comparison between two anchors participating in the competition in the live window is obtained according to information on support comparison between the anchors, which indicates that one of the anchors is at an advantage in the competition and the other is not at an advantage in the competition. For example, FIG. 10 shows an application scenario in some embodiments. For example, support comparison between anchor le with No. 303 and anchor dl with No. 218 is determined as 1:19. It indicates that anchor dl with No. 218 is at an advantage in the competition, and thus the volume of the anchor in the live competition is increased. It is determined that anchor le with No. 303 is not at an advantage in the competition, and thus the clarity of the anchor in the live competition is reduced so as to indicate that the anchor is at a disadvantage in the competition. Support comparison between anchor ee with No. 119 and anchor ff with No. 120 is determined as 7:6, which indicates that anchor ee with No. 119 is at an advantage in the competition. It is determined that anchor ff with No. 120 is not at an advantage in the competition, and thus the clarity and the volume of the anchor in the live competition are reduced so as to indicate that the anchor is at a disadvantage in the competition The method of reducing the clarity of the anchor in the live competition includes, but is not limited to: blurring whole or part of the body of the anchor, mosaicing the body or the partial body of the anchor, blurring the partial or whole background of the scenario where the anchor is located. It can be appreciated by those skilled in the art that the above mentioned method of reducing the clarity of the anchor in the live competition is merely an example. Other existing methods of reducing the clarity of the anchor in the live competition or those that may appear in the future fall within the protection scope of the present application and are incorporated herein by reference, if applicable to the present application, for example, blurring the entire image of a corresponding anchor.

Figure 11:
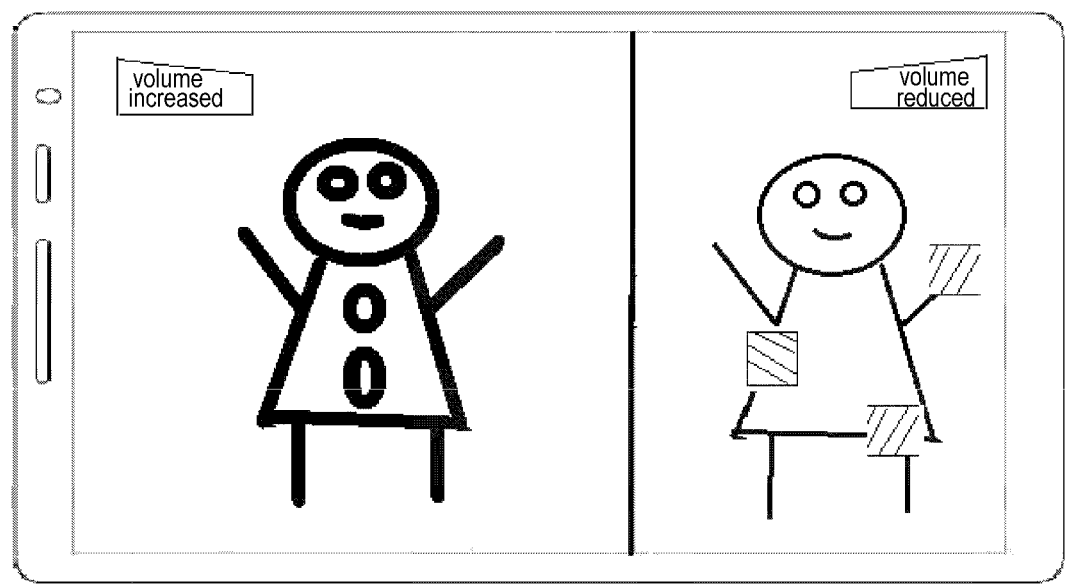

In some embodiments, information on a ratio of screen-occupied proportions of, information on clarity comparison between, and information on volume comparison between two anchors participating in the competition in the live window are obtained according to information on support comparison between the anchors, which indicates that one of the anchors is at an advantage in the competition and the other is not at an advantage in the competition. For example, FIG. 11 shows an application scenario in some embodiments. Support comparison between anchor le with No. 303 and anchor dl with No. 218 is determined as 8:19, and thus a ratio of screen-occupied proportions of the two anchors in the live window is obtained as 8:19. It indicates that anchor dl with No. 218 is at an advantage in the competition, and thus the screen-occupied proportion and the volume of the anchor in the live competition are increased. It is determined that anchor le with No. 303 is not at an advantage in the competition, and further, the clarity of the anchor in the live competition is reduced so as to indicate that the anchor is at a disadvantage in the competition.

As another example, support comparison between anchor ff with No. 120 and anchor ll with No. 207 is determined as 8:5, and thus a ratio of screen-occupied proportions of the two anchors in the live window is obtained as 8:5. It indicates that anchor ff with No. 120 is at an advantage in the competition, and thus the screen-occupied proportion of the anchor in the live competition is increased. It is determined that anchor ll with No. 207 is not at an advantage in the competition, and thus the clarity and the volume of the anchor in the live competition are reduced so as to indicate that the anchor is at a disadvantage in the competition. The method for reducing the clarity of the anchor in the live competition include, but are not limited to: blurring whole or part of the body of the anchor, mosaicing the body or the partial body of the anchor, blurring the partial or whole background of the scenario where the anchor is located. It can be appreciated by those skilled in the art that the above mentioned method of reducing the clarity of the anchor in the live competition is merely an example. Other existing methods of reducing the clarity of the anchor in the live competition or those that may appear in the future fall within the protection scope of the present application and are incorporated herein by reference, if applicable to the present application, for example, blurring the entire image of a corresponding anchor.

It can be appreciated by those skilled in the art that the above mentioned method of adjusting the display of the anchor competition is merely an example. Existing methods of adjusting the display of the anchor competition or those that may appear in the future all fall within the protection scope of the present application and are incorporated herein by reference, if applicable to the present application.

In some embodiments, the network device respectively determines information on accumulated user support respectively won by the at least two anchors according to information on user support respectively won by the at least two anchors; and determines the information on support comparison between the at least two anchors according to the information on accumulated user support respectively won by the at least two anchors.

For example, referring to Table 4 below, the conversion between information on user support includes, but is not limited to: 1 flower=5 likings; 1 red packet=10 likings; 1 red packet=2 flowers; 1 luxury car=5,000 likings; 1 yacht=10, 000 likings.

TABLE 4

| | | Information on User Support | | | | | |
|---|---|---|---|---|---|---|---|
| Anchor No. | Nickname of Anchor | Number of viewers | Number of Likings | Number of flowers | Number of red packets | Luxury Cars (unit) | Yachts (unit) |
| 1161 | aaa | 385 | 361 | 300 | 259 | 0 | 0 |
| 1271 | cec | 1000 | 998 | 977 | 915 | 5 | 1 |
| 3181 | dcc | 957 | 913 | 696 | 800 | 3 | 0 |
| 4512 | bbb | 653 | 546 | 498 | 324 | 0 | 0 |

For example, the accumulated user support for anchor cec with No. 1271 and anchor dcc with No. 3181 is determined as 5 and 3 according to the information on user support in terms of luxury cars respectively, and thus support comparison between the two anchors is determined as 5:3. The accumulated user support for anchor aaa with No. 1161 and anchor bbb with No. 4512 is determined as 818 (300+259*2=818) and 1146 (498+324*2=1146) according to information on user support in terms of number of flowers respectively, and thus support comparison between the two anchors is determined as 8:11. The accumulated user support for anchor cec with No. 1271 and anchor dcc with No. 3181 is determined, respectively, according to the information on user support in terms of number of likings as 50033 (1*10000+5*5000+915*10+977*5+998=50033) and 27393 (3*5000+800*10+696*5+913=27393), and thus support comparison between the two anchors is determined as 5:2. The accumulated user support for anchor aaa with No. 1161 and anchor dcc with No. 3181 is determined as 385 and 957 according to information on user support in terms of number of viewers respectively, and thus support comparison between the two anchors is determined as 3:9, i.e., 1:3. The accumulated user support for anchor aaa with No. 1161 and anchor bbb with No. 4512 is determined as 259 and 324 according to information on user support in terms of number of red packets respectively, and thus support comparison between the two anchors is determined as 2:3.

It can be appreciated by those skilled in the art that the above mentioned method of determining information on accumulated user support is merely an example. Existing methods of determining the information on accumulated user support or those that may appear in the future all fall within the protection scope of the present application and are incorporated herein by reference, if applicable to the present application.

Figure 12:
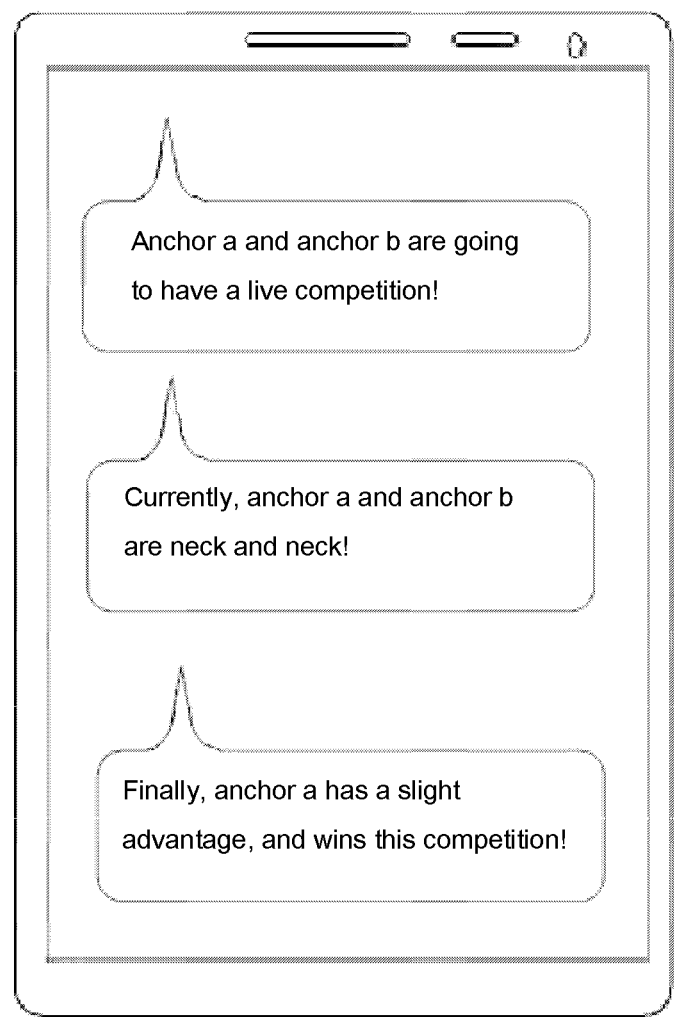

In some embodiments, the method further comprises step S16 (not shown): the network device sending competition related information of the anchor competition to users following the at least two anchors. For example, the network device sends, to users following anchor a or b, competition related information of competitions in which the anchor participates through information pushing, or the like. The competition related information includes, but is not limited to: information on notification of an upcoming competition between anchor a and anchor b, live information of the competition between anchor a and anchor b, information on result of the competition between anchor a and anchor b (as shown in FIG. 12).

In some embodiments, the competition related information includes, but is not limited to:
information on screen capture of the display of the anchor competition;
information on user support for the at least two anchors participating in the anchor competition;
information on support comparison between the at least two anchors participating in the anchor competition;
information on user support for the anchors followed by users.

With regard to the information on screen capture of the display of the anchor competition, continued with the above example, the network device takes a screen capture of the display of the anchor competition between anchor a and anchor b, and sends the information on screen capture to the users following anchor a or anchor b, which helps the users obtain the anchor competition status intuitively, improves user interaction experience, and enhances readability.

For example, the information on user support for the at least two anchors participating in the anchor competition is shown in FIG. 13.

Anchor aa with No. 116 won support of 38,500,000 according to the information on user support in terms of number of viewers; and anchor dc with No. 118 won support of 89,640,000 according to the information on user support in terms of number of flowers; and so on.

For example, the information on support comparison between the at least two anchors participating in the anchor competition is shown in FIG. 14. Support comparison between anchor ce with No. 117 and anchor dc with No. 118 is determined as 2:3, and so on.

For example, the information on user support for the anchors followed by users is shown in FIG. 13. For example, user support respectively won by anchor ff with No. 120 followed by a user according to number of viewers, number of likings, number of flowers, and number of red packets are 64,210,000, 55,100,000, 29,010,000, 5,890,000, and so on.

It can be appreciated by those skilled in the art that the above mentioned competition related information is merely an example. Other existing competition related information or those that may appear in the future all fall within the protection scope of the present application and are incorporated herein by reference, if applicable to the present application.

The present application also provides a computer-readable storage medium storing computer codes. The methods as recited in any of the previous clauses are performed when the computer codes are executed.

The present application also provides a computer program product. The methods as recited in any of the previous clauses are performed when the computer program product is executed by a computer device.

The present application also provides a computer device. The computer device comprises:
one or more processors;
a memory for storing one or more computer programs;
wherein the one or more computer programs, when executed by the one or more processors, cause the one or more processors to implement the methods as recited in any of the previous clauses.

It should be noted that the present application can be implemented in software and/or a combination of software and hardware, for example, by using an application specific integrated circuit (ASIC), a general purpose computer, or any other similar hardware device. In one embodiment, the software program of the present application can be executed by a processor to implement the steps or functions described above. Likewise, the software programs (including related data structures) of the present application can be stored in a computer readable storage medium such as a RAM memory, a magnetic or optical drive or a floppy disk and the like. In addition, some of the steps or functions of the present application may be implemented in hardware, for example, as a circuit that cooperates with a processor to perform various steps or functions.

In addition, a portion of the present application can be embodied as a computer program product, such as computer program instructions, when executed by a computer, can invoke or provide a method and/or technical solution in accordance with the present application. It is to be understood by those skilled in the art that computer program instructions exist in a computer-readable medium in a form of including, but not limited to, a source file, an executable file, an installation package file, and the like. Correspondingly, the manner in which a computer program instruction is executed by a computer includes, but is not limited to, the computer directly executing the instruction, or the computer compiling the instruction and then executing the corresponding compiled program, or the computer reading and executing the instruction, or the computer reading and installing the instruction and then executing the corresponding post-installation program. Here, the computer-readable medium can be any available computer-readable storage medium.

Communication medium includes medium by which communication signals which include, for example, computer-readable instructions, data structures, program modules, or other data, are transmitted from one system to another. Communication medium can include guided transmission medium (such as cables and wires (e.g., fiber optics, coaxial, etc.)) and wireless (non-conductive transmission) medium that can propagate energy waves, such as sound, electromagnetic, RF, microwave, and infrared. Computer readable instructions, data structures, program modules or other data may be embodied, for example, as a modulated data signal in a wireless medium, such as a carrier wave or a similar mechanism such as being embodied as part of a spread spectrum technology. The term "modulated data signal" refers to a signal whose one or more characteristics are altered or set by encoding information in the signal. Modulation can be analog, digital, or can be hybrid modulation techniques.

By way of example and not limitation, computer-readable storage medium may include volatile and non-volatile, removable and non-removable medium implemented by any method or technology used to store information such as computer readable instructions, data structures, program modules or other data. For example, computer-readable storage medium includes, but is not limited to, volatile memory such as random access memory (RAM, DRAM, SRAM); and non-volatile memory such as flash memory, various read-only memories (ROM, PROM, EPROM, EEPROM), magnetic and ferromagnetic/ferroelectric memory (MRAM, FeRAM); and magnetic and optical storage devices (hard disk, cassette, CD, DVD); or other existing or known medium or any medium to be developed in the future that can store computer-readable information/data for use by computer systems.

Herein, an embodiment in accordance with the present application includes an apparatus including a memory for storing computer program instructions and a processor for executing program instructions, wherein when the computer program instructions are executed by the processor, triggering the apparatus to operate the aforementioned methods and/or technical solutions in accordance with various embodiments of the present application.

For those skilled in the art, it is apparent that the present application is not limited to the details of the above-mentioned exemplary embodiments, and the present application can be implemented in other specific forms without departing from the spirit or basic features of the present application. Therefore, the present embodiments are to be considered as illustrative and not restrictive. The scope of the present application is defined by the appended claims rather than the above-mentioned description, and therefore it is intended that all changes which fall within the meaning and range of equivalency of the claims are embraced in the present application. Any reference signs in the claims should not be construed as limiting the claims involved. In addition, it is apparent that the word "comprising" does not exclude other elements or steps, and the singular does not exclude the plural. A plurality of units or means stated in the apparatus claims may also be implemented by one unit or means by means of software or hardware. The terms first and second and the like are used to represent names and do not represent any particular order.

What is claimed is:

1. A method for displaying an anchor competition process, comprising:
  obtaining information on user support respectively won by at least two anchors during the competition in real time, wherein the at least two anchors participate in the same anchor competition and are displayed in a same live window;
  determining information on support comparison between the at least two anchors according to the information on user support respectively won by the at least two anchors;
  adjusting the display of the anchor competition for the at least two anchors in the live window according to the information on support comparison
  sending the adjusted display of the anchor competition to user equipments displaying the competition between the at least two anchors, or presenting the adjusted display of the anchor competition to users who are watching the competition between the at least two anchors,
  wherein the step of adjusting the display of the anchor competition comprises at least one of:
  adjusting a ratio of screen-occupied proportions of the at least two anchors in the live window such that the ratio of screen-occupied proportions is adaptive with the support comparison;
  adjusting a clarity comparison between the at least two anchors in the live window such that the clarity comparison is adaptive with the support comparison;
  adjusting a volume comparison between the at least two anchors in the live window such that the volume comparison is adaptive with the support comparison.

2. The method according to claim 1, wherein the method further comprising:
  obtaining at least two anchors who participate in the same anchor competition;

initializing the live window of the anchor competition, wherein the at least two anchors are displayed in split screens in the live window.

3. The method according to claim 2, wherein the step of obtaining at least two anchors who are to participate in the same anchor competition comprising:
  determining at least two anchors who participate in the same anchor competition according to anchor related information.

4. The method according to claim 3, wherein the anchor related information comprises at least one of:
  information on rankings of anchors;
  information on recommended anchor competitions initiated by users;
  information on competition invitations initiated between anchors.

5. The method according to claim 3, wherein the step of obtaining at least two anchors who participate in the same anchor competition comprising:
  determining at least two anchors who participate in the same anchor competition according to the anchor related information and information on an anchor matching threshold, wherein a matching degree between the at least two anchors is greater than or equals to the anchor matching threshold.

6. The method according to claim 1, wherein the step of adjusting the ratio of screen-occupied proportions of the at least two anchors in the live window further comprising:
  in the process of adjusting the ratio of screen-occupied proportions, if a screen usage proportion of one of the at least two anchors in the live window is less than or equals to a screen proportion threshold, reducing clarity or volume of the anchor in the live window such that the clarity comparison or the volume comparison between the at least two anchors is adaptive with the support comparison.

7. The method according to claim 1, wherein the step of determining information on support comparison between the at least two anchors according to the information on user support respectively won by the at least two anchors comprising:
  respectively determining information on accumulated user support respectively won by the at least two anchors according to the information on user support respectively won by the at least two anchors;
  determining the information on support comparison between the at least two anchors according to the information on accumulated user support respectively won by the at least two anchors.

8. The method according to claim 1, wherein the method further comprising:
  sending competition related information of the anchor competition to users following the at least two anchors.

9. The method according to claim 8, wherein the competition related information comprises at least one of:
  information on a screen capture of the display of the anchor competition;
  information on user support for the at least two anchors participating in the anchor competition;
  information on support comparison between the at least two anchors participating in the anchor competition;
  information on user support for the anchors followed by the users.

10. A device for showing an anchor competition process in live, the device comprising:
  a processor; and
  a memory configured to store computer executable instructions, wherein the executable instructions, when executed, cause the processor to:
  obtain information on user support respectively won by at least two anchors during the competition in real time, wherein the at least two anchors participate in the same anchor competition and are displayed in a same live window;
  determine information on support comparison between the at least two anchors according to the information on user support respectively won by the at least two anchors;
  adjust the display of the anchor competition for the at least two anchors in the live window according to the information on support comparison;
  send the adjusted display of the anchor competition to user equipments displaying the competition between the at least two anchors, or presenting the adjusted display of the anchor competition to users who are watching the competition between the at least two anchors,
  wherein the step of adjusting the display of the anchor competition comprises at least one of:
  adjusting a ratio of screen-occupied proportions of the at least two anchors in the live window such that the ratio of screen-occupied proportions is adaptive with the support comparison;
  adjusting a clarity comparison between the at least two anchors in the live window such that the clarity comparison is adaptive with the support comparison;
  adjusting a volume comparison between the at least two anchors in the live window such that the volume comparison is adaptive with the support comparison.

11. A non-transitory computer readable medium comprising instructions, wherein the instructions, when executed, cause a system to:
  obtain information on user support respectively won by at least two anchors during the competition in real time, wherein the at least two anchors participate in the same anchor competition and are displayed in a same live window:
  determine information on support comparison between the at least two anchors according to the information on user support respectively won by the at least two anchors;
  adjust the display of the anchor competition for the at least two anchors in the live window according to the information on support comparison;
  send the adjusted display of the anchor competition to user equipments displaying the competition between the at least two anchors, or presenting the adjusted display of the anchor competition to users who are watching the competition between the at least two anchors,
  wherein the step of adjusting the display of the anchor competition comprises at least one of:
  adjusting a ratio of screen-occupied proportions of the at least two anchors in the live window such that the ratio of screen-occupied proportions is adaptive with the support comparison:
  adjusting a clarity comparison between the at least two anchors in the live window such that the clarity comparison is adaptive with the support comparison:
  adjusting a volume comparison between the at least two anchors in the live window such that the volume comparison is adaptive with the support comparison.

* * * * *